United States Patent [19]

Netzel et al.

[11] 3,920,938
[45] Nov. 18, 1975

[54] HIGH VOLTAGE CIRCUIT BREAKER UNITARY POLE MOLDINGS

[75] Inventors: Philip C. Netzel, Milmont Park; Thomas F. Brandt, Swarthmore; Harold F. Strack, Alden, all of Pa.

[73] Assignee: I-T-E Imperial Corporation, Spring House, Pa.

[22] Filed: Feb. 13, 1974

[21] Appl. No.: 442,208

[52] U.S. Cl. ............ 200/50 AA; 317/103; 200/293; 174/145
[51] Int. Cl.² ..................................... H01H 33/00
[58] Field of Search ............ 317/103, 112, 99, 118, 317/120; 200/50 AA, 144 R, 144 B, 153 R, 153 V, 293, 146 AA; 174/139, 145, 156, 157

[56] References Cited
UNITED STATES PATENTS

| | | | |
|---|---|---|---|
| 3,397,293 | 8/1968 | Darrow | 200/50 AA |
| 3,603,753 | 9/1971 | Frink | 200/50 AA |
| 3,735,065 | 5/1973 | Brandt, Jr. | 200/50 AA |

Primary Examiner—Gerald P. Tolin
Attorney, Agent, or Firm—Ostrolenk, Faber, Gerb & Soffen

[57] ABSTRACT

Supports for high voltage circuit interrupters comprising a plurality of identical unitary moldings each capable of being mounted right or left and providing integral elements or extensions for supporting, between a pair of such moldings, the circuit interrupter elements, the operating elements therefor, the upper and lower disconnect bushings and contact members of each pole; a three pole circuit interrupter may thus utilize six of such unitary moldings. The bases of the moldings are slotted to receive bolts or other securing devices which secure the moldings to a movable platform which may be a truck mounting for the circuit interrupters. The slots are successively arranged with entry from opposite sides of the bases to rigidify the moldings against skewing under the mechanical or electrical forces which may be imposed.

7 Claims, 12 Drawing Figures

HIGH VOLTAGE CIRCUIT BREAKER UNITARY POLE MOLDINGS

The present invention relates to circuit breakers and more specifically to unitary pole unit moldings therefor; that is, to structures which may be used to support the individual poles of for instance a three pole circuit breaker or other switchgear preferably in a truck mounted arrangement which may be racked in and out by the switchboard. The invention relates to the support structure for the switchgear rather than to the internal structure of the switchgear per se.

BACKGROUND OF THE INVENTION

The present invention is an improvement of the invention shown in U.S. Pat. No. 3,728,508 Operating Mechanism for Vacuum circuit Breaker Including Contact Pressure Springs and U.S. Pat. No. 3,735,065 Low Profile Circuit Breaker with Staggered Terminals, both of which patents are assigned to the assignee of the present invention. In each of these patents a low profile circuit breaker is shown in a three pole arrangement in which vacuum interrupters are utilized in a horizontal plane at each pole and the moving contacts are operated by a toggle mechanism. The actual structure and the arrangement of the circuit breakers is described in those patents.

One of the important problems which arises in the construction of circuit breakers of the type disclosed in said patents is that of maintaining proper alignment of the interrupters and the operating mechanism and that of providing for simplified assembly in the factory and the field. For this purpose it is desirable that the interrupters and their associated mechanism be mounted in a unitized frame which may be readily put together as a bench assembly and be mounted on the breaker truck as a unit and which also may be readily assembled in the field.

BRIEF SUMMARY OF THE INVENTION

The mechanism and the interrupter assembly for operating the same are secured to the truck by lead moldings, one pair of lead moldings being used for each pole of the circuit breaker unit. The upper and lower circuit breaker bushings are assmbled into the lead moldings and the lead moldings are bolted to the breaker truck. Slotted openings in the lead moldings are provided with nut plates for mounting of the mechanism frame. Similarly slotted holes are provided in the bases of the moldings for mounting to the truck. The slotted openings in the bases of the moldings are arranged on opposite sides to prevent rotation or skewing of the molding on the truck thereby ensuring appropriate alignment of each of the poles of the breaker. Access openings are provided in the lead moldings to permit tightening of the mounting hardware. There are also access openings in the main body of each lead molding for observation and adjustment of the interrupter operating mechanism. Each of the moldings is so designed that it may be used on either the right or left side of each pole unit assembly. Six identical moldings are thus used to make up a three phase assembly one pair of moldings being used for each phase.

The basic principle of the present invention therefore is the provision of a modular or standardized lead molding which may be used to support the interrupter and its operating mechanism, a molding of the same kind being used on each side of each pole so that manufacture of rights and lefts are not necessary.

A further object of the present invention is to provide a simplified means of modular construction for erecting a three pole circuit breaker and mounting the same on the truck.

These and other objects of the present invention will become apparent in the following description and drawings in which:

FIG. 5 is an end view partly in section of the circuit breaker pole of FIG. 1 taken from line 5—5 of FIG. 1 and looking in the direction of the arrows.

FIG. 6 is an end view of the lead molding plate of FIG. 2 taken from the righthand side of FIG. 2.

FIG. 7 is a view taken on line 7—7 of FIG. 2 looking in the direction of the arrows.

FIG. 8 is a view taken on line 8—8 of FIG. 2 and looking in the direction of the arrows.

FIG. 9 is a view taken on line 9—9 of FIG. 2 looking in the direction of the arrows.

FIG. 10 is an end view of the molding plate of FIG. 2 looking toward the left side of the structure.

FIG. 11 is a top view of the molding plate of FIG. 2.

FIG. 12 is a bottom view of the molding plate of FIG. 2.

DETAILED DESCRIPTION OF THE INVENTION

The circuit breaker structure here shown is that previously referred to and described in the aforementioned U.S. Pat. Nos. 3,728,508 and 3,735,065 both assigned to the assignee of the present invention.

Figure 1:
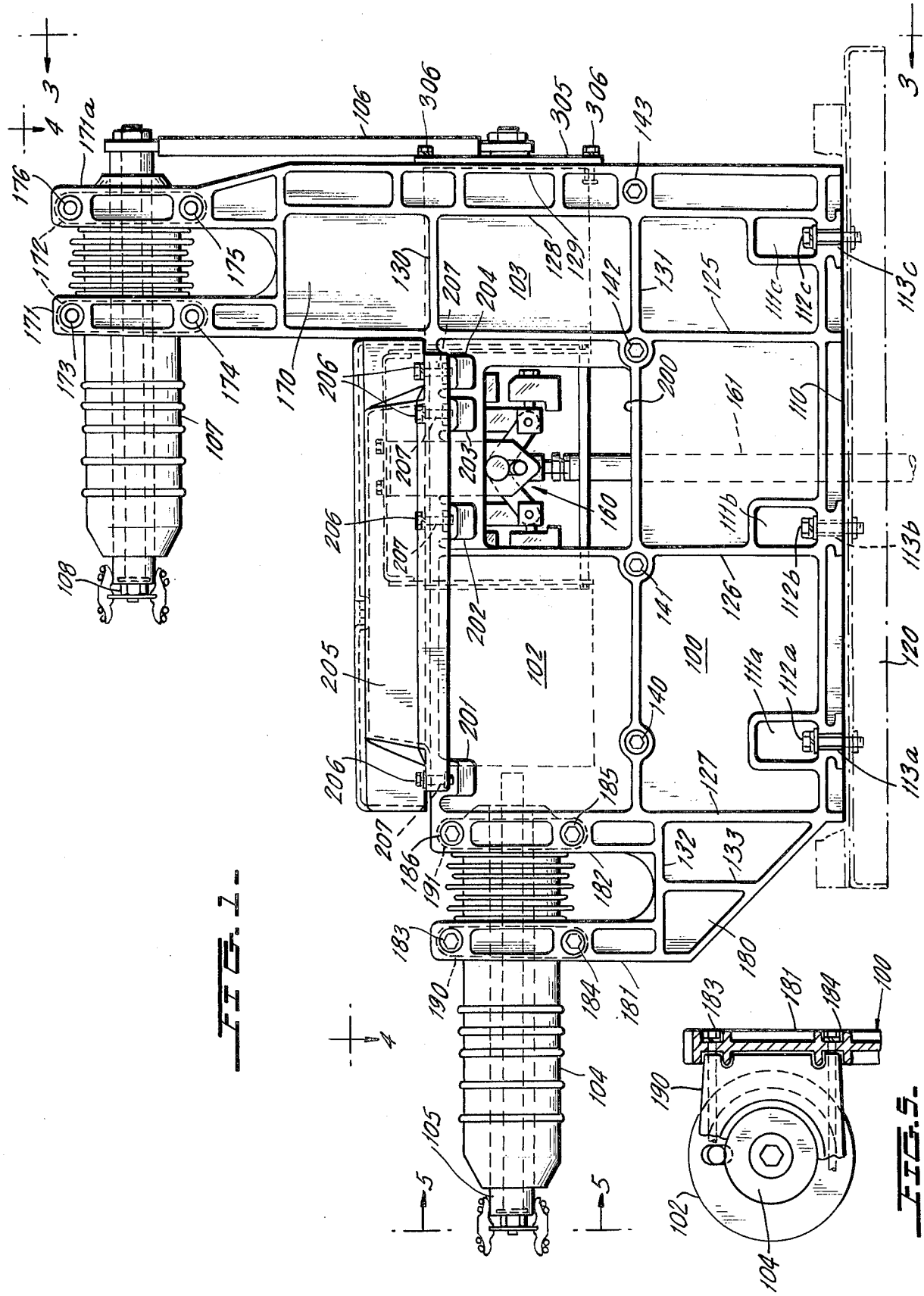
FIG. 1 is a side view of a single pole unit of a circuit breaker showing the lead molding in use for supporting all of the elements and parts of the circuit breaker.
Figure 2:
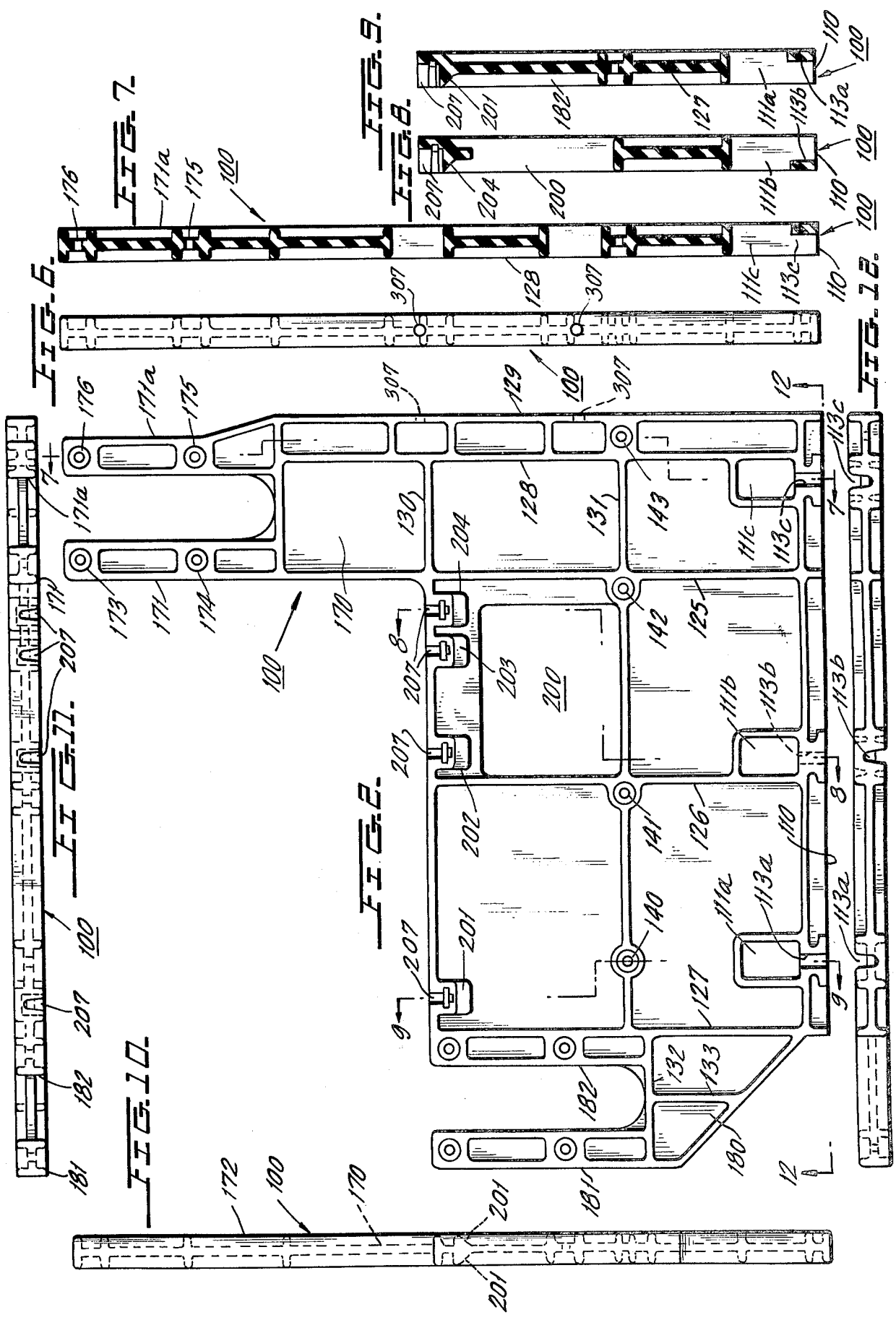
FIG. 2 is a side view of one of the pair of lead moldings which are used to support a single pole of the circuit breaker.
Figure 3:
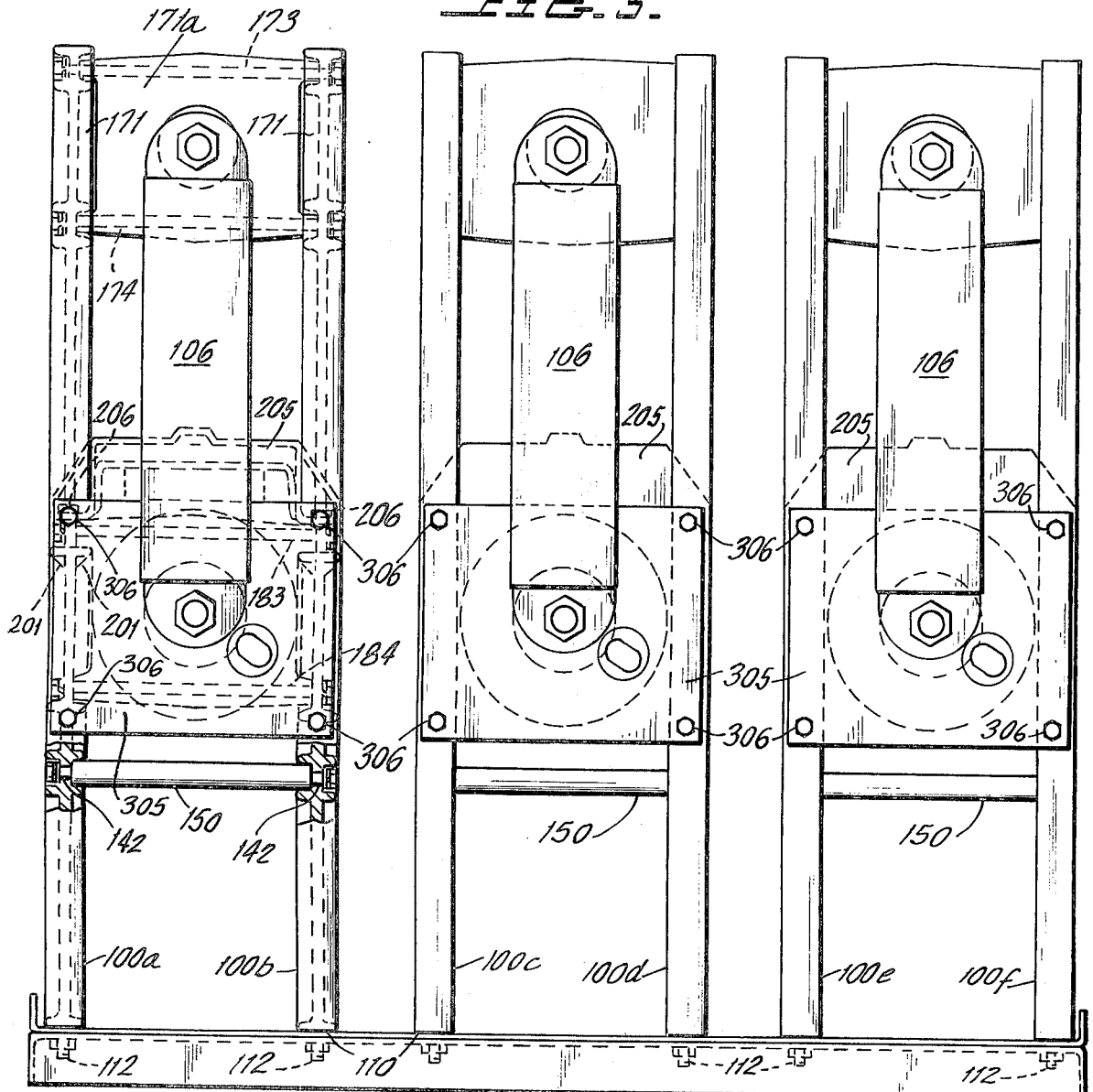
FIG. 3 is a front view of a three pole circuit breaker utilizing six such lead moldings of the type shown in FIG. 2 mounted on a truck.

In FIGS. 1, 2 and 3 there are shown support molding structures 100 which serve to support vacuum interrupter bottles 102 and 103 respectively at each pole. A terminal bushing 104 for each pole having a primary disconnect contact 105 at the end thereof is connected to the fixed contact terminal of vacuum bottle 102. An electrical conductor bar 106 is connected to the fixed contact terminal of vacuum bottle 103 and the conductor bar is appropriately connected to suitable supported upper bushing 107 having the second primary disconnect contact 108 at the end thereof. Note that the primary disconnect contacts 105 and 108 are not disposed above one another but are staggered in position in order to permit a low profile for the circuit breaker. That is, a given dielectric spacing is obtained between terminals 105 and 108 where the spacing is not a completely vertical spacing as was previously required. Consequently a 38 KV breaker can be mounted in an outdoor cubicle having a height less than about 6 feet which can conveniently be shielded or hidden by common shrubbery to produce an unimposing appearance for the substation using the switchgear.

As will be seen from FIG. 3 each of the three poles of the circuit breaker is supported in position by a pair of lead molding plates of the type shown in FIG. 2 wherein plates 100a and 100b support the lefthand pole of the circuit breaker between them, plates 100c and 100d support the middle pole of the circuit breaker between them and plates 100e and 100f support the righthand pole of the circuit breaker between them. Each of the plates 100 (100a, 100b, 100c, 100d, 100e, 100f) is provided with a base 110 as seen in FIGS. 1, 2, and 3; the molding having a plurality of successive openings 111a, 111b, 111c above the base 110. Each of the openings 111 provides access so that a bolt 112 may be inserted in an appropriate slot 113a, 113b, 113c of the base (see FIG. 9 as well as FIGS. 1, 2, 3).

It will be noted that the successive openings 113a, 113b, 113c are offset with respect to each other entering from opposite sides of the lead molding so that the lead molding is supported by bolts 112 which are clamped on the upper face of the lower portion of the openings 111a, 111b, 111c and are secured into the truck 120 which supports the circuit breaker.

In this way each of the lead moldings 100 is secured to the truck 120 to provide the successive pairs of lead moldings which will support separate poles of the circuit breaker structure. Each of the moldings 100 is also provided with appropriate vertical ribs 125, 126, 127, 128, 129 to rigidify the same and with horizontal ribs 130, 131 as well as other ribbed structures 132, 133 which will hereinafter be described in detail.

Figure 4:
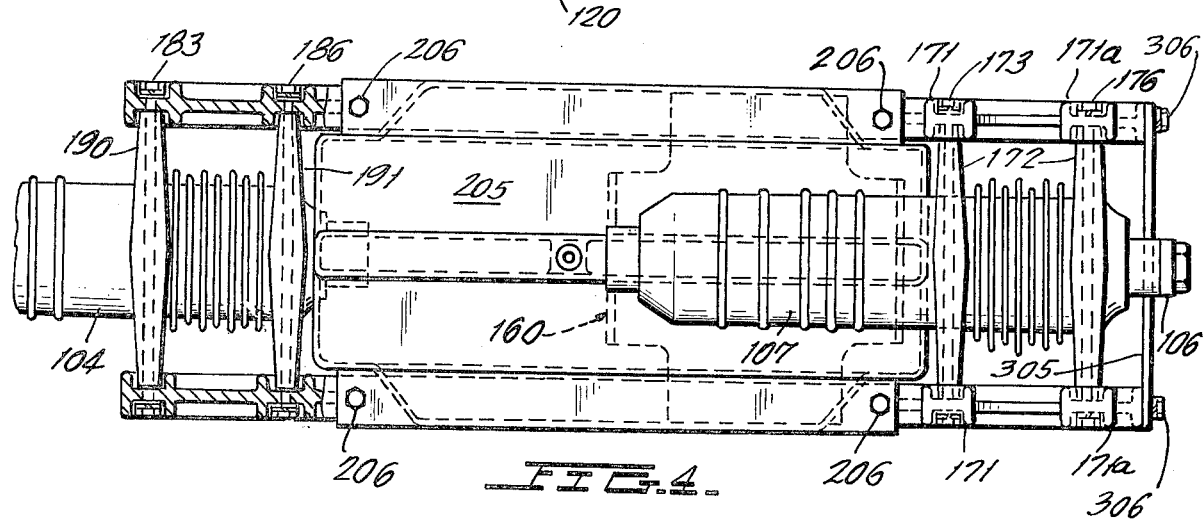
FIG. 4 is a top view of the circuit breaker pole of FIG. 1 taken from line 4—4 of FIG. 1 and looking in the direction of the arrows.

Along the ribs and at certain of the junctures between the vertical and horizontal ribs, openings 140, 141, 142, 143 are provided in each of the moldings in order to permit interconnection of each pair of moldings as for instance by the cross brace 150 which is shown extending between openings 142, 142 in moldings 100a, 100b of FIG. 3 and to provide structural support for the vacuum bottle interrupters 102, 103 and the operating mechanism 160. The operating mechanism 160 is fully described in U.S. Pat. Nos. 3,728,508 and 3,735,065 and requires no further description here other than the fact that the operating mechanism 160 operated by the rod 161 serves when moved in one direction to close the contacts in the series vacuum bottles 102, 103 and when moved in the other direction to open the contacts in the series connected vacuum bottles 102, 103. Each of the moldings 100 (FIG. 2) is also provided with a forward upward extension 170 having the upwardly extending arms 171 and 171a which serve to support a part of the upper contact bushing 107 between them as shown particularly in FIGS. 1 and 3. Cross ties or braces 172, 172 which may also assist in supporting the contact bushing extend between openings 173, 174, 175, 176 in each molding on one side to corresponding openings on the other side. The conductor bar 106 is connected as previously pointed out to the front of the bushing structure 107 and, at its lower end, is connected to the front vacuum bottle 103. A similar construction is utilized to support the lower contact bushing where extension 180 of the molding 100 on each side has upwardly extending arms 181 and 182 each of which has openings 183, 184, 185, 186; corresponding openings in corresponding pairs of moldings will receive cross bar support members 190, 191 as shown particularly in FIG. 4 in order to support the lower connecting member 104 and to interlock and brace the structures. It will be noted particularly from FIG. 9 that the elements of the molding 113a, b, c which receives the bolt 112 are staggered or open from successively opposite sides.

Thus the molding 100a of FIG. 3 will be supported on the truck 120 on both sides of the molding by the bolts 112 through the successive openings 113a, 113b, 113c while the molding 100b will be similarly supported on the truck 120 on both sides. Consequently there are no rights or lefts with respect to the moldings 100a and 100b and any molding may be used in either position. It will also be obvious that while three such slots 113a, 113b, 113c have been shown in the drawing a greater number of such slots may be used where the structure requires it.

Where desired the molding may also be provided with appropriate openings, as for instance the opening 200, to provide access to certain elements of the circuit breaker which may require adjustment. In this case the opening at 200 provides access to the toggle operating mechanism as shown particularly in FIG. 1. The molding may also be provided with a plurality of upper abutments as shown at 201, 202, 203, 204 on each side. Such abutments may be utilized to provide a bearing or rest for a cover member 205 (see FIG. 1 and 3). The cover members 205 for each pole may then be placed on each pair of lead moldings as for instance 100a, 100b, of FIG. 3 and bolts 206, 206 driven into and clamped with respect to slots 207, 207 at the top of the lead molding as seen more particularly in FIG. 11.

Front plates 305 secured to the moldings by bolts 306 secured in openings 307 of plates 100 also serve to integrate and rigidify the structure of each pole.

It will be obvious that the abutments 201–204 must extend on both sides of the upper edge of the lead molding 100 so that the lead molding may interchangeably be used on either side.

The remainder of the circuit breaker structure requires no specific description since the circuit breaker structure per se is described in the two U.S. Pat. Nos. 3,728,508 and 3,735,065 above referred to. Basically it will be seen that by utilizing a lead molding 100 of the type shown in FIG. 2 the circuit breaker shown in FIG. 1 may be assembled with one such lead molding 100 on each side and supported therebetween so that a three phase circuit breaker may be assembled as shown in FIG. 3 using six of the lead moldings.

The utilization of a single type of molding for either the right or left side and the utilization of a complete molding which will support all elements including not only the upper and lower leads but also the circuit breaker structure itself provides a simplified method of rigidifying and aligning the structure so that the circuit breaker contacts, the back disconnect contacts and the operating elements will all be factory aligned when assembled; and may also be readily aligned in the field.

In the foregoing the invention has been described in connection only with illustrative embodiments thereof. Since many variations and modifications of the present invention will now be obvious to those skilled in the art it is preferred that the scope of the present disclosure be bound not by the specific illustrative embodiments herein contained but only by the appended claims.

The embodiments of the invention in which an exclusive privilege or property is claimed are defined as follows:

1. A high voltage circuit interrupter having circuit making and breaking contact structures, an operating mechanism for said contact structures and upper and lower connecting members to connect said first mentioned contact structures in a circuit; said upper and lower connecting members extending substantially parallel to each other but terminating at the operative connecting end thereof in different vertical planes;

a pair of preformed molded support members; each molded member extending on each side of said circuit making and breaking contact structures and parallel to said upper and lower connecting members;

each preformed molded member constituting a unitary support structure having a base and a rigid vertical web extending upwardly from said base;

a first vertical extension from said web adjacent one end thereof suporting said upper connecting member;

a second extension from said web adjacent on opposite end thereof supporting said lower connecting member;

supports for said circuit making and breaking contact structures, said operating mechanism and said connecting members;

means on said vertical web and its extensions engaging said last mentioned supports;

said pair of preformed molded support members supporting said circuit making and breaking contact structure, operating mechanism and connecting members between them;

each of said pair of preformed molded members on each side being identical to the other;

the base of each molded support member having substantially horizontal flanges extending on each side of the vertical web;

a plurality of horizontal slots in said flanges said slots each extending from an edge of a flange to beneath said vertical web; certain of said slots being open on one side of said web and others of said slots being open on the other side of said web;

and an opening in said web above each slot providing access to the top of the base at each slot.

2. A high voltage circuit interupter having the preformed molded support members of claim 1, wherein a truck is provided for supporting said pair of preformed molded support members;

the base of each preformed molded support member resting on said truck;

securing means engaging the upper surface of each base flange at each slot and extending into and engaging said truck;

said securing means being operable through said openings in said web above each slot;

each said securing means also abutting the end of said slot opposite the open end thereof.

3. A high voltage circuit interrupter having the preformed molded support members of claim 1, wherein an additional opening is provided in each web adjacent the said operating mechanism for access thereto.

4. A high voltage circuit interrupter having the preformed molded support members of claim 2, wherein an additional opening is provided in each web adjacent the said operating mechanism for access thereto.

5. A high voltage circuit interrupter having the preformed molded support members of claim 4, wherein a three pole circuit interrupter is provided with six identical said preformed molded support members, each adjacent pair of said preformed molded support members supporting a single pole structure between them; all of said members being supported on a single truck.

6. A high voltage circuit interrupter having the preformed molded support members of claim 2, wherein additional support extensions are provided on each web on each side thereof above said base;

certain of the additional support extensions on one side of one preformed molded support cooperating with similar additional support extensions on the opposite side of the other preformed molded support member to support an additional structure between them.

7. A high voltage circuit interrupter having the preformed molded support member of claim 6, wherein said additional support extensions are located adjacent the upper portion of the principal web on each preformed molded support member;

and a cover carried on said extensions between said pair of preformed molded support members.

* * * * *